Sept. 28, 1948.  P. F. BECHBERGER  2,450,076
CABIN PRESSURE CONTROL
Filed Nov. 5, 1940
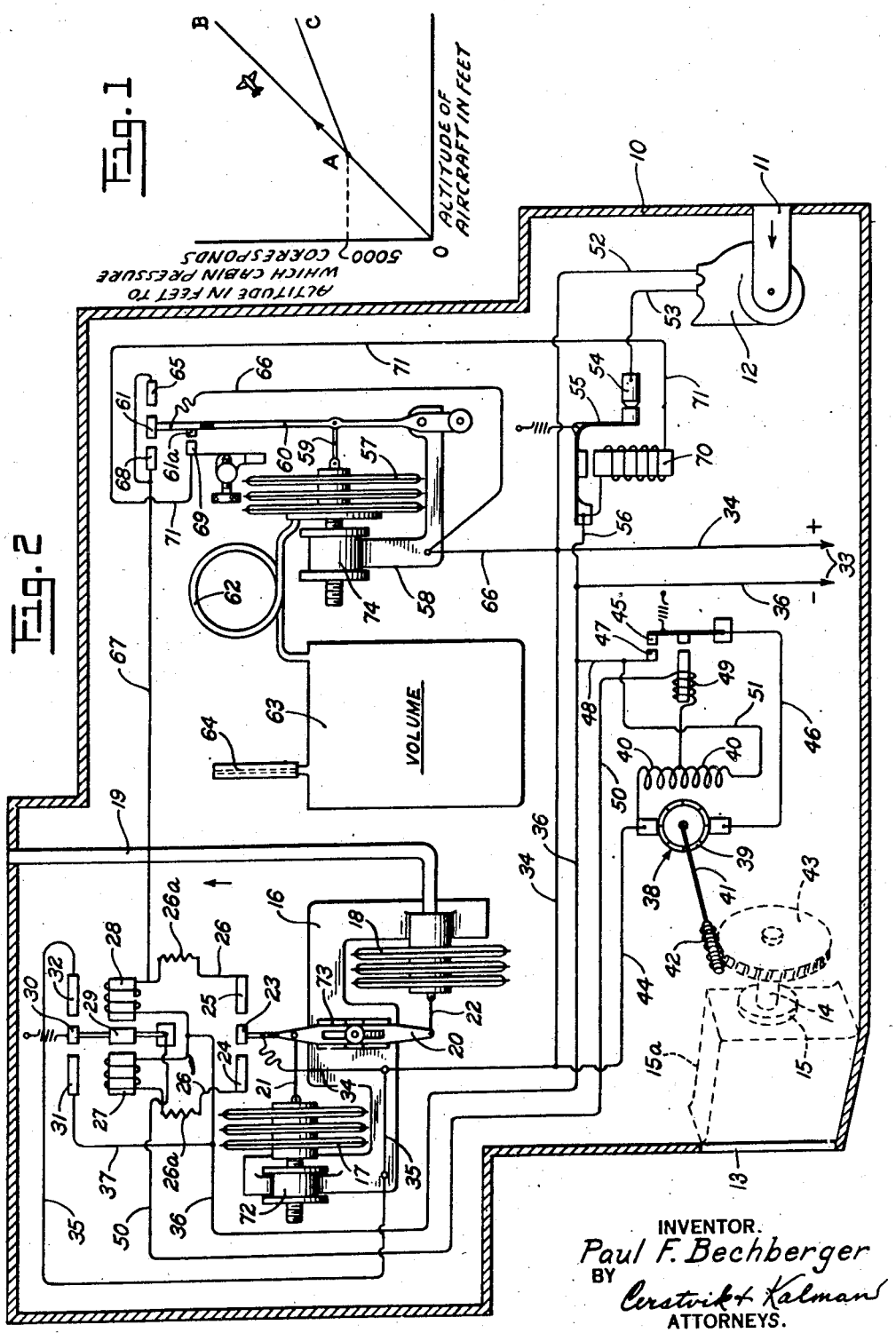
INVENTOR.
Paul F. Bechberger
BY
Cerstvik & Kalman
ATTORNEYS.

Patented Sept. 28, 1948

2,450,076

UNITED STATES PATENT OFFICE 2,450,076

CABIN PRESSURE CONTROL

Paul F. Bechberger, Tenafly, N. J., assignor to Bendix Aviation Corporation, Bendix, N. J., a corporation of Delaware Application November 5, 1940, Serial No. 364,468

5 Claims. (Cl. 98—1.5)

This invention relates generally to pressure control for chambers or compartments and more particularly to cabin pressure control in aircraft or the like for use during excessive altitude flight.

An object of the present invention is to provide a novel arrangement or system for the control of pressures within the interior of cabins or compartments on aircraft used in traversing high altitudes so as to automatically maintain desirable pressures which are conducive to the good health and comfort of the occupants thereof.

Another object of the invention is to provide a novel pressure control arrangement for use in aircraft wherein the cabin is properly ventilated, thereby providing adequate circulation of air in the cabin and also the proper pressure for the comfort of the occupants.

Another object of the invention is to provide a novel pressure control system for use in aircraft traversing high altitudes, wherein the pressures outside and inside of the cabin are substantially equal until a predetermined altitude is attained at which point the communication to the exterior of the cabin is closed and the cabin pressure is automatically increased. Means are further provided so that in the event the cabin pressure thus obtained exceeds a given value, the interior of the cabin is caused to communicate with the atmosphere until the cabin pressure attains the desired value.

A further object of the invention is to provide a novel arrangement of the character described above wherein the cabin pressure is determined automatically as a function of the combined value of the pressure within the cabin on the one hand and the value of the differential pressure of the interior and exterior cabin pressures on the other hand.

Another object of the invention is to provide a novel arrangement of the character described above, wherein means are provided whereby the cabin pressure control is modified so that the interior cabin pressure does not build up as a direct function of the increasing altitude but at a value less than a direct function and in proportion to the varying altitude. If the interior cabin pressure were increased as a direct function of the increasing altitude, stresses would arise in the cabin which, to be overcome, would require bracing structures adding materially to the weight of the cabin. Since the latter is highly undesirable, the present arrangement is provided and the pressures maintained thereby are sufficient to overcome any discomfort to the occupants which would result if no provision of the above nature were made for use in traversing high altitudes.

A further object of the invention is to provide a novel pressure control system for use in aircraft traversing high altitudes wherein the pressure interior of the cabin is further controlled as a function of the rate of change of pressure within the cabin during too rapid a rate of climb or descent of the aircraft.

Another object of the invention is to provide in a system of the character above described a novel control of the interior cabin pressure during rapid rate of climb or descent of the aircraft.

The above and further objects and novel features of the invention will more fully appear from the following detailed description when the same is read in connection with the accompanying drawings. It is to be expressedly understood, however, that the drawings are for purposes of illustration only and are not intended as a definition of the limits of the invention, reference for the latter purpose being had primarily to the appended claims.

In the drawings, wherein like reference characters refer to like parts, throughout the several views, Figure 1 is a curve illustrating the principle and the function of the present invention; and, Figure 2 is an illustrative view, partially diagrammatic, of a cabin pressure control arrangement embodying the present invention.

For a better understanding of the principles utilized in the present invention, reference will be made primarily to Figure 1 of the drawings. The curves there illustrated represent the desired cabin pressure with respect to varying atmospheric pressures at varying altitudes. As illustrated, the cabin pressure varies directly as a function of the increasing altitude until a given point, arbitrarily chosen for purposes of clarity as 5000 feet, is reached. At this point the novel arrangement comprising the present invention comes into operation, closes the communication of the cabin with the atmosphere, and the cabin pressures instead of following curve OAB are modified in such a manner as to follow instead the curve OAC which represents the built up pressure within the cabin suitable and ample for the health and comfort of the occupants at the increasing altitude.

For a more detailed description of the various parts constituting the novel cabin pressure control arrangement reference is made to Figure 2 of the drawings wherein 10 represents a wall of a sealed airtight cabin having arranged therein the subject matter of the invention. The wall 10 is provided with a suitable opening or aperture 11 communicating atmospheric pressure outside of the cabin to the inlet side of a blower 12 arranged within the cabin in any desired manner and a second opening generally designated at 13 having a valve (not shown) suitably arranged upon a shaft 14, journaled in a bearing 15, within a valve casing 15a for opening and closing communication between the cabin interior and ambient or external atmosphere. Any suitable valve casing and any suitable blower may be provided for the above purposes and since the particular structures thereof are not here involved, they have been diagrammatically illustrated at 12 and 15a for purposes of simplicity.

Mounted upon a suitable support 16 within the interior of the cabin is an evacuated aneroid member 17 which is sensitive to cabin pressures only and a pressure differential responsive element 18 responding on the outside thereof to cabin pressures and at the interior thereof communicating with atmospheric pressure by way of a conduit or tube 19 which is open to the atmosphere outside of the cabin wall.

Pivotally mounted on the support 16 intermediate the members 17 and 18 is a differential link 20 having one end thereof secured for movement by the aneroid 17 through a connecting link 21 and the other end thereof secured for movement with the element 18 by way of a connecting link 22.

Differential link 20 is provided with a suitably insulated contact member 23 which cooperates with a pair of relay contacts 24 and 25 which are electrically connected by way of resistors 26a and a lead 26 coiled about cores 27 and 28 constituting the relays which as a unit define a differential relay. A soft iron member 29 is pivotally mounted intermediate the two cores 27 and 28 for movement thereby during energization of the relays and carries a resiliently constrained contact member 30 which cooperates with contact elements 31 and 32, the former determining the open valve position and the latter the closed valve position of the valve housed within valve casing 15a.

One side of the supply source 33, which may constitute a battery, is connected to the differential link contact member 23 by way of a lead 34, the latter having a lead 35 tapped thereto for electrical connection with the "close" position contact 32. The other side of the supply source is electrically connected by way of a suitable conductor 36 with the lead 26 at a point intermediate the two cores 27 and 28 of the relay so as to complete one circuit from the source 33, by way of lead 34, contacts 23 and 24 or 25, lead 26, and back to the source by way of conductor 36. A lead 37 tapped to condctor 36 connects "open" position contact 31 with the latter side of the power source.

A reversible motor, generally designated at 38, is provided for operating the valve within the casing 15a and comprises an armature 39 and field windings 40 therefor. The armature 39 is adapted for driving a shaft 41 carrying a worm 42 at its free end meshing with a gear 43 splined to the shaft 14 carrying the valve.

One side of the armature 39 communicates with the positive side of the source 33 by way of a lead 44 tapped to lead 34 and the other side of the armature is in open communication with the negative side of the source by way of a pivoted contact member 45 connected to the latter armature side by means of a lead 46. The pivoted contact 45, normally in open circuit position, places the armature 39 across the supply lines 34 and 36 in closed circuit position with the source when it is urged against a stationary contact member 47 connected to the negative side of the source by way of a lead 48 tapped to lead 36. Contacts 45 and 47 are closed in response to the energization of a relay 49 which connects electrically with the pivoted contact member 30 by way of a conductor 50 at one end thereof and with the midpoint of the field windings 40 at the other end thereof.

Assuming engagement between pivoted contact member 30 and "open" valve position contact 31, resulting from closure of contacts 23, 24 by aneroid 17 and diaphragm 18 prior to the craft's attaining the position A of Fig. 1, relay 49 is energized placing the armature 39 across the supply lines. Current flows from source 33, leads 34 and 44, one side of armature 39 to one portion of field windings 40, relay 49, lead 50, contacts 30 and 31 and back to the other side of the supply source by way of leads 37 and 36. With energization of the upper half of field 40—40 only, as illustrated in Fig. 2, the armature is driven to operate shaft 41 to open the valve and permit communication between the interior of the cabin and ambient or external atmosphere. Engagement between pivoted contact 30 and "close" position contact 32, on the other hand, due to the closure of contacts 23, 25 by aneroid 17 and diaphragm 18 after the craft has passed position A of Fig. 1, places the armature 39 across the power lines by the energization of relay 49 and current flows from the positive side of source 33, leads 34 and 35, through contacts 32 and 30, lead 50, relay 49, the lower portion only of field windings 40, as illustrated in Fig. 2, and back to the negative side of the source by way of a lead 51 thereby driving the armature and shaft in the opposite direction to close the valve and cut off communication of the cabin with the exterior thereof.

The blower 12 is connected across the power source at all times, with one exception to be pointed out hereinafter, by way of conductor 52 on one side thereof and at the other side thereof by way of lead 53, contacts 54 and 55, which normally are in the position shown in the drawing, and lead 56.

In conditions where the rate of climb or descent of the craft is too rapid, the pressure change within the cabin likewise will be rapid and to prevent the latter situation, for example, when the rapid change takes place prior to the craft's attaining the position A shown on the curve of Figure 1, that is, when contacts 23 and 24 are held in engagement by aneroid 17 and diaphragm 18 so that the valve of casing 15a is open, a rate of pressure change sensitive instrument is provided to this end having control preference over the aneroid 17 and pressure differential element 18 in closing the valve.

The rate of pressure change sensitive instrument consists of a differential pressure responsive element 57 mounted in the cabin upon a suitable support 58 and connects by way of link 59 to drive a pivotally mounted link 60 carrying an insulated contact 61 at the free end thereof.

The normal pressures within the element 57 equal the interior cabin pressures with which the element communicates by way of a conduit or tube 62, expansion chamber 63, and calibrated leak 64. It is apparent that the leak 64 offers restricted communication between the interior of the element 57 and the cabin interior so that during rapid changes in cabin pressure produced during rapid rate of climb, the pressure differential on the outside and inside of element 57 builds up since the air cannot flow as readily through the leak 64 to the cabin interior, and the pressure being greater inside the element 57, the latter is caused to expand thereby moving contact 61 into engagement with a contact 65.

As previously considered, a rapid rate of climb has been initiated prior to the craft's reaching position A of Figure 1, and, at this condition, aneroid 17 and diaphragm 18 maintain contact 23 in engagement with contact 24 so that contact 30 is in engagement with contact 31 and the valve is open whereby the rapid drop in pressure due to the rapid climb is communicated to the cabin. Element 57 responds to the rapid pressure drop within the cabin to close contacts 61 and 65.

Contact 61 is electrically connected by way of a lead 66 with one side of the source and when contact 61 engages contact 65 current flows from the source through contacts 61 and 65 to energize the winding of the relay having core 28 by way of a conductor 67 and then flows back to the source through leads 26 and 36. Because of the resistors 26a the current flowing in lead 67 is greater than the current flowing through contacts 23 and 24 and therefore closing of contacts 61 and 65 gives preference to the action of element 57 over the action of aneroid 17 and diaphragm 18. Upon energization of the latter relay winding having core 28, contact 30 is moved away from contact 31 and engages contact 32, thereby energizing relay 49 and driving armature 39 to close the valve thereby overcoming excessive pressure change during rapid rate of climb. It is to be noted, that during the rapid ascent a separate circuit constituting leads 34, 66, contacts 61, 65, lead 67, the winding of the relay having core 28, leads 26 and 36 has been energized thereby controlling and closing the valve independently of the action of aneroid 17 and diaphragm 18. The blower 12 being in operation and with the valve closed begins to build up cabin pressure.

On the other hand, where the rate of craft descent is too rapid, rapidly increasing pressures within the cabin are undesirable and to remedy the latter a second function is accorded to the differential pressure responsive element 57. With rapid descent, when the valve is open, the pressure builds up rapidly within the cabin while the pressures within the element 57 are smaller and though air flows through leak 64 into element 57 to equalize the pressures, the flow is restricted and the greater cabin pressures cause the element to collapse swinging the pivoted link 60 in the opposite direction thereby causing its contact 61 to engage a contact 68. When contacts 61 and 68 engage current flows from the source to energize the winding of the relay having core 28 again, to thereby energize motor 38, as heretofore described, and the valve is closed. At the same time that contact 61 engages contact 68 a second contact 61a mounted on pivoted lever 60 engages an adjustable contact 69 thereby energizing a relay 70 by way of a lead 71 which causes disengagement of contacts 54 and 55 thereby turning off the blower.

The various elements are arranged within a seal tight cabin, as above described, and while the craft is on the ground the valve is in open position for the reason that the pressures outside and inside of the cabin are substantially equal and therefore have a neutralizing effect upon the pressure differential responsive element 18.

The aneroid 17, on the other hand, being evacuated, collapses due to the relatively greater cabin pressures thereby holding contact 23 in engagement with contact 24 and contact 30 in engagement with contact 31 so that the valve within casing 15a is maintained in an open position. The blower 12, since it is directly across the supply source, operates on the ground level and thereby affords ample ventilation and air circulation within the cabin.

During actual flight and prior to the time that the craft reaches a predetermined altitude, such as indicated at point A on the curve of Figure 1, the aneroid 17 maintains contacts 23 and 30 in engagement with contacts 24 and 31. The point A may be determined by setting the aneroid to respond to any desired pressure by means of an adjustable member 72 provided for the aneroid 17. When the altitude indicated at A is reached and passed the pressure within the cabin drops, thereby acting on the aneroid 17 causing it to expand, moving contact 23 away from contact 24 and against contact 25 whereby motor 38 is energized to close the valve and the blower 12 builds up pressure within the cabin. The increased cabin pressure reacts upon the outside of the pressure differential element 18 and since the atmospheric pressure at its interior is relatively smaller, the element 18 collapses thereby moving the contact 23 away from contact 25. The circuit to motor 38 is interrupted by the opening of contacts 23, 25 to de-energize the motor but the valve at this condition remains in its closed position. Obviously, should the pressures built up be too great, both elements 17 and 18 will act additively upon differential link 20 to move contact 23 to engage contact 24 to energize the motor in an opposite direction and open the valve, releasing some of the pressure until the desired amount has been reached. The desired pressure at which the element 18 acts to release contacts 23 from contact 25 may be readily determined by either sliding or adjusting differential link 20 in a groove 73 formed on the support 16 or varying the length of link 22 between the element 18 and link 20. The pressure differential element 18, therefore, acts additively with aneroid 17 to cause the pressure developed in the cabin upon increasing altitudes to substantially follow the curve AC of Figure 1.

Although elements 17 and 18 normally control the valve position, still a rapid rate of climb on the part of the craft at a point prior to that indicated at A (Figure 1) causes rapid pressure change within the cabin with consequent discomfiture to the occupants. As soon as rapid rate of climb occurs, the rate of pressure change within the cabin, the valve being open, is effective to operate element 57 to close contacts 61 and 65 thereby taking preference over elements 17 and 18 and closing the valve. The cabin pressure, with the valve closed, is again normally regulated by means of elements 17 and 18. A reverse but similar condition exists when the rate of descent is too rapid. In the latter condition, with the valve open, rate of pressure rise or change within the cabin is great and the element 57 collapses to close the valve and at the same time to turn off the power supply to the blower 12. The rate of change of pressure at which the element 57 may respond may be adjusted by way of an adjusting device 74.

Thus, there has been shown and described a novel arrangement for automatic cabin pressure control wherein the cabin pressure is normally determined as a function of the existing cabin pressure and the differential of the existing cabin pressure and the atmospheric pressure whereby the cabin pressure is determined in proportion to varying altitudes, and, further, wherein during rapid climb or descent, a rate of change of pressure element has preference over the normal control to close the valve in either condition and to control the blower during rapid descent.

Although but one embodiment of the present invention has been illustrated and described in detail, it is to be expressly understood that the invention is not limited thereto. For example, supports 16 and 58 could be grounded, thereby overcoming the use of separate or direct leads from the supply source to the contact members 23 and 61. Various changes in the design and arrangement of the parts can be made without departing from the spirit and scope of the invention as the same will now be understood by those skilled in the art. For a definition of the limits of the invention, reference will be had primarily to the appended claims.

What is claimed is:

1. An aircraft having a compartment, an energized blower for building up pressure in said compartment, valve means normally communicating the interior of the compartment with the exterior thereof, a pressure sensitive element having one side in communication with the pressure within said compartment and the other side thereof in restricted communication with said compartment pressure, switch means adapted to be actuated by the movement of said pressure sensitive element upon a predetermined rate of change in compartment pressure, and a circuit including said switch means, said blower and said valve means; the movement of said pressure sensitive element in one direction when the cabin pressure falls at a rate higher than a pre-selected value during ascent of the craft actuating said switch to operate said valve means to close the communication between the interior and exterior of said compartment, the movement of said element in an opposite direction when cabin pressure rises at a rate higher than a pre-selected value during rapid descent of the craft actuating said switch to operate said valve means to close the communication between the interior and exterior of said compartment and to de-energize simultaneously said blower.

2. An aircraft having a compartment, a continuously energized blower for building up pressure within said compartment, valve means normally communicating the interior of the compartment with the exterior thereof, means including a pressure sensitive element responding to compartment pressure only, and a second pressure sensitive element responding to the differential of the compartment pressure and atmospheric pressure outside thereof for operating said valve means when the pressure within said compartment has reached a predetermined value to close communications between the interior and exterior of said compartment, said elements being operative to actuate said valve means to open communication with the exterior of said compartment when the pressure built up by said blower exceeds a predetermined amount; and a third pressure sensitive element having one side in communication with the pressure within said compartment and the other side thereof in restricted communication with said compartment pressure for operating said valve means and for de-energizing said blower upon a predetermined rate of change in compartment pressure.

3. An aircraft having a cabin, a continuously energized blower for building up pressure within said cabin, valve means normally communicating the interior of the cabin with the exterior thereof, means including a pressure sensitive element responding to cabin pressure only and a second pressure sensitive element responding to the differential of the cabin pressure and the atmospheric pressure outside thereof for operating said valve means when the pressure within said cabin has reached a predetermined value to close communication between the interior and the exterior of said cabin; said elements being operative to actuate said valve means to open communication with the exterior of said cabin when the pressure built up by said blower exceeds a predetermined amount, and a third pressure sensitive element having one side in communication with the pressure within said cabin and the other side thereof in restricted communication with said cabin pressure for simultaneously assuming primary control of said valve means and deenergize said blower during a rapid descent of said craft.

4. An aircraft having a sealed cabin, a continuously energized blower means for building up pressure within said cabin, valve means communicating the interior of the cabin with the exterior thereof, control means for operating said valve means to maintain the pressures within the cabin in a predetermined relation with respect to the atmospheric pressure outside of said cabin, and means comprising a resilient member having one side thereof in direct communication with the cabin pressure and an opposite side thereof in restricted communication with the cabin pressure responsive to a predetermined rate of change of pressure within said cabin during a rapid rate of descent of said craft for closing said valve means and de-energizing said blower means.

5. An aircraft having a sealed cabin, a continuously energized blower means for building up pressure within said cabin, valve means communicating the interior of the cabin with the exterior thereof, and means comprising a resilient member having one side thereof in direct communication with said cabin pressure and an opposite side in restricted communication with said cabin pressure and actuated during a predetermined rate of change of pressure within said cabin during rapid rate of descent of said craft when said valve means is open, for de-energizing said blower means and operating said valve means to close communication between the interior and the exterior of said cabin.

PAUL F. BECHBERGER.

REFERENCES CITED

The following references are of record in the file of this patent:

UNITED STATES PATENTS

| Number | Name | Date |
|---|---|---|
| 1,511,489 | Armstrong | Oct. 14, 1924 |
| 1,562,663 | Strong | Nov. 24, 1925 |
| 2,002,057 | Gregg | May 21, 1935 |
| 2,208,554 | Price | July 16, 1940 |

FOREIGN PATENTS

| Number | Country | Date |
|---|---|---|
| 149,709 | Great Britain | Aug. 17, 1920 |
| 679,386 | France | Jan. 9, 1930 |